Sept. 30, 1930.  E. WILDHABER  1,777,024
DIFFERENTIAL MECHANISM
Filed July 11, 1927  3 Sheets-Sheet 1
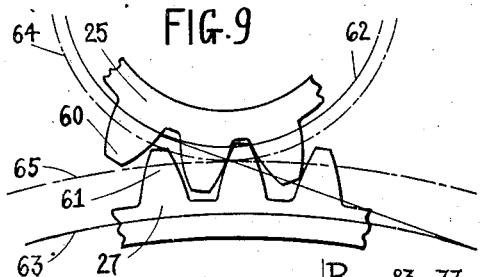
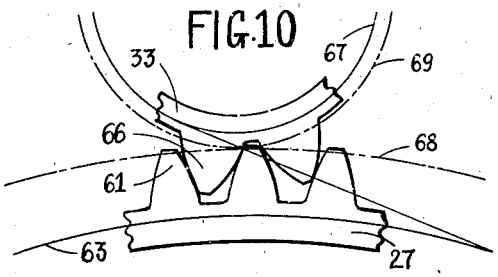
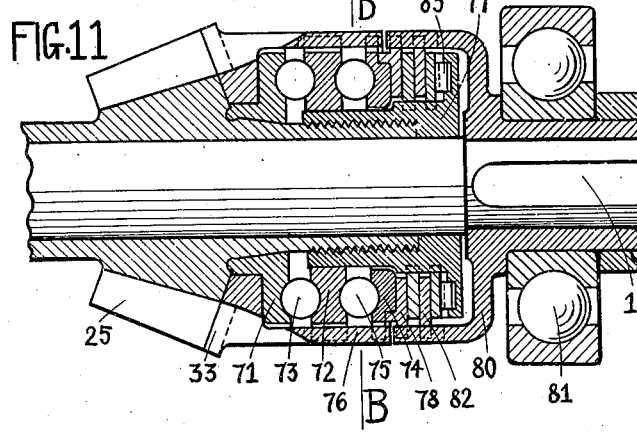
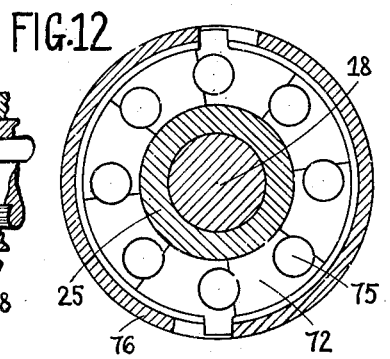
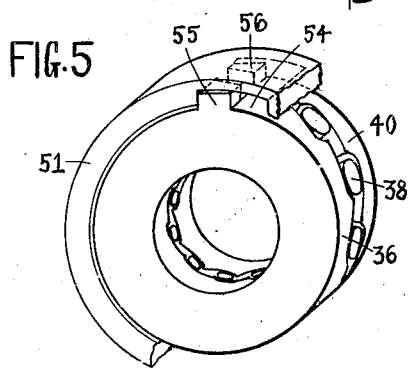
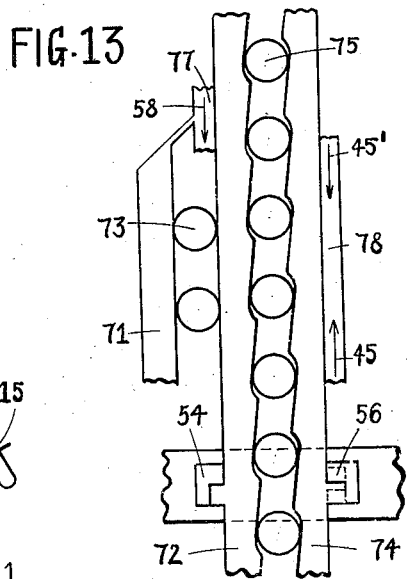
INVENTOR
Ernest Wildhaber Sept. 30, 1930.  E. WILDHABER  1,777,024
DIFFERENTIAL MECHANISM
Filed July 11, 1927   3 Sheets-Sheet 2

INVENTOR

Ernest Wildhaber

Sept. 30, 1930.    E. WILDHABER    1,777,024
DIFFERENTIAL MECHANISM
Filed July 11, 1927    3 Sheets-Sheet 3
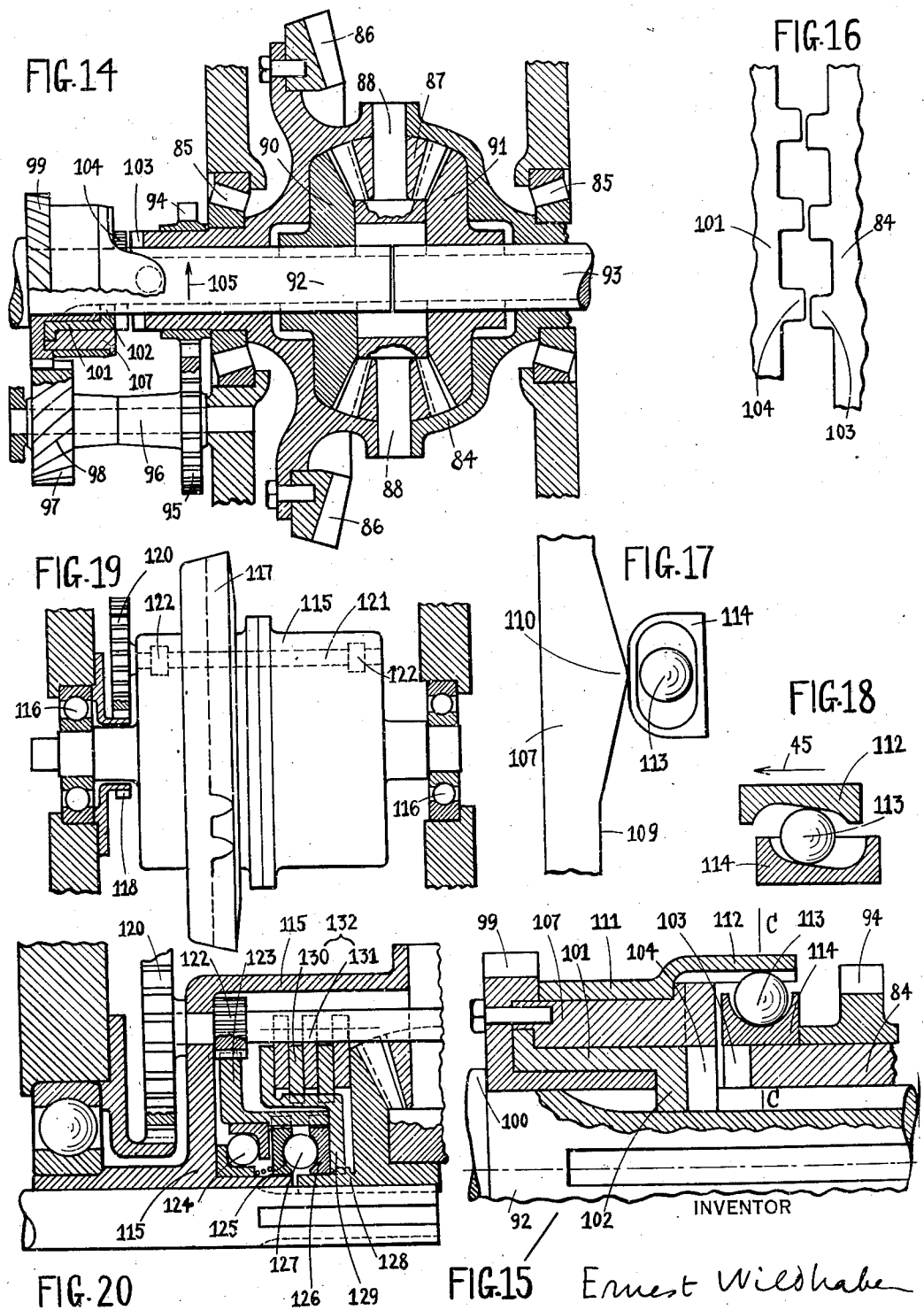

Patented Sept. 30, 1930

1,777,024

UNITED STATES PATENT OFFICE

ERNEST WILDHABER, OF BROOKLYN, NEW YORK

DIFFERENTIAL MECHANISM

Application filed July 11, 1927. Serial No. 204,901.

The present invention relates to differential mechanisms for vehicles, such as automobiles, trucks and tractors. Differential mechanisms of the type referred to contain a driving member and two driven members, and serve to apply power to said driven members in a manner which permits different motions of said driven members. Ordinarily said two driven members of the differential mechanism are operatively connected with two road wheels or driven wheels of the vehicle, for instance with the two rear wheels.

When the vehicle makes a turn, its road wheels rotate at different rates, when they roll upon the ground, and a differential mechanism, as well known, permits different rotation of the driven wheels, to which power is applied.

The freedom permitted for instance the driven rear wheels of a vehicle, by a differential mechanism of conventional construction, is however a serious drawback in certain moments. When one of the two driven wheels slips, and finds little or no resistance on the ground, then no power can be applied to the other wheel either. The slipping wheel spins around freely, and the vehicle is powerless and helpless in such moments. Such conditions may exist on icy or on wet roads, and on muddy or very soft ground.

One object of the present invention is to add to a differential gear such means, as will prevent said dangerous conditions, and which will permit to transmit power to a wheel also when the other wheel slips.

A further object is to provide a safety differential mechanism which positively and immediately prevents spinning of a slipping wheel.

It is a further purpose of the present invention to provide a purely mechanical mechanism, serving the dual purpose of a differential gear and of effecting positive motion under all circumstances.

A still other purpose is to introduce a new principle to the operation and construction of differential mechanisms.

Other objects will be apparent in the course of the specification and from recital of the appended claims.

The invention is exemplified in the accompanying drawings, in which

Fig. 1 is a diagrammatic plan view of a vehicle, showing its wheels in a limit position, and explanatory of a new principle of the present invention.

Fig. 5 is a perspective view of a one way clutch, such as may be used in differential mechanisms constructed according to my invention.

Fig. 9 and Fig. 10 are diagrammatic views of a gear meshing with two pinions of equal proportions but different numbers of teeth, and referring to gears of Fig. 2 and Fig. 3.

Fig. 11 is an axial section illustrative of novel parts of another form of differential mechanism.

Fig. 12 is a section along lines B—B of Fig. 11.

Fig. 13 is a diagram explanatory of the operation of the modification of my invention illustrated in the Figures 11 and 12.

Fig. 14, is a plan view, shown largely in section, of another embodiment of my invention.

Fig. 15 is an enlarged section of parts shown in Fig. 14.

Fig. 16, Fig. 17 are diagrams explanatory of the operation of the embodiment shown in the Figures 14 and 15.

Fig. 18 is a partial section along lines C—C of Fig. 15.

Fig. 19 is a plan view, partly a section, of another embodiment of my invention.

Fig. 20 is an enlarged section, partly a view, of parts shown in Fig. 19.

Figure 2:
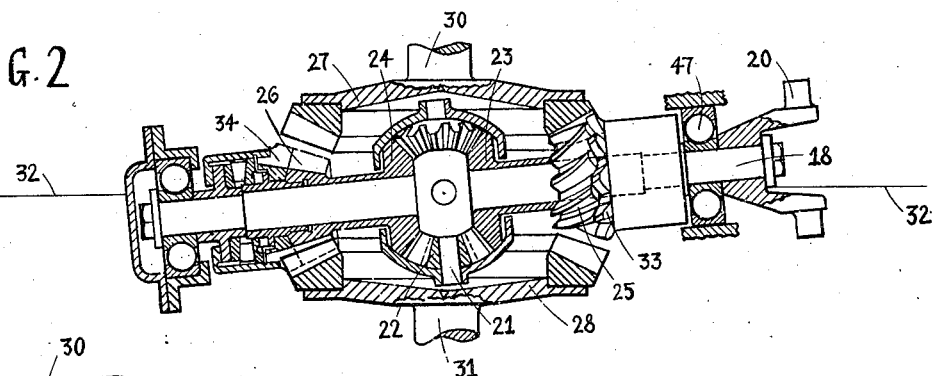
Fig. 2 is a plan view, shown largely in section, of one embodiment of a differential mechanism constructed in accordance with the present invention.

While my differential mechanism is broadly applicable to trackless vehicles, it will be specifically described as applied to rear axles of vehicles.

In Fig. 1 I have diagrammatically shown a vehicle, containing a frame 11, rear wheels 12 and 13 mounted coaxially, and front wheels 14, 15. These wheels will hereafter be referred to as road wheels, but it is understood, that they might also be embodied as the wheels of an agricultural tractor, and operate on fields rather than on roads.

In current practice the front wheels are preferably so swung around for steering in a curve, that their axes intersect the axis of the rear wheels substantially in a common point (16). The vehicle turns then around point 16, the latter being the center point or pivot of the motion, and the road wheels turn in proportion to their respective distances from that center 16. An extreme position has been shown in Fig. 1, in which point 16 is located from the inner rear wheel 12 at a distance about three times the distance between the rear wheels 12, 13, as an example. The average velocity of the two rear wheels is proportional to their average distance from point 16, that is to the distance 16—17; point 17 being located midway between the two rear wheels. In the steering position indicated, the velocity of wheel 12 is a fraction of the average velocity, the said fraction being equal to the proportion of the distance of wheel 12 from center 16 to the distance 16—17. With the proportions assumed in Fig. 1, this fraction is equal to $\frac{3}{3\frac{1}{2}}$ or also $\frac{6}{7}$. The velocity of rear wheel 13 on the other hand is somewhat larger than the average velocity, its proportion being $\frac{4}{3\frac{1}{2}}$ or also $\frac{8}{7}$.

In intermediate steering positions the wheels 12 and 13 turn at velocities which are less different from the average velocity.

In the service desired the rear wheels turn either at the same rate, or with slight deviations from the average velocity, so as to keep inside of certain proportions with respect to the average velocity, its proportions being in the above example $\frac{6}{7}$ and $\frac{8}{7}$. Any velocity of an individual wheel between $\frac{6}{7}$ and $\frac{8}{7}$ average velocity will be normal service.

When a wheel slips and spins, it will turn faster, namely as much as twice the average velocity.

According to the present invention the speed of the rear wheels 12 and 13 is limited to a zone of speed proportions, such as the zone between $\frac{6}{7}$ and $\frac{8}{7}$ times the average speed, and the rear wheels are prevented from assuming speeds of higher proportion than the upper limit and of lower proportion than the lower limit. With this novel principle spinning is eliminated, and a car remains under control even under very difficult conditions.

The driven wheels 12 and 13 ordinarily move inside the said speed proportions, and if one wheel slips its speed will be kept at the upper limit of said proportion, and the speed of the other wheel at the lower limit. The two wheels turn then in a definite relation to each other, the ordinary freedom of the two rear wheels having been terminated as long as one wheel slips.

Means for keeping the speed proportions of the two wheels (12 and 13) inside of given limits will first be described with reference to the embodiment illustrated in the Figures 2 and 3.

The differential mechanism there illustrated is of the type where a gear reduction is provided after a differential gear proper.

A drive shaft 18 receives power from a motor, through such means as a universal joint, of which a fork 20 is indicated. Shaft 18 is provided with pivots 21, projecting radially from said shaft. Planetary pinions 22 are mounted on said pivots, and mesh with sun gears 23, 24, which are coaxial with shaft 18. Pinions 22 and gears 23, 24 constitute a differential gear of known type. Gears 23, 24 are integral with pinions 25, 26 respectively, which mesh with gears 27, 28 which are connected through shafts 30, 31 with two road wheels (such as 12, 13, Fig. 1) of a vehicle. The gears 27, 28 are of equal size; and to prevent interference between pinion 25 and gear 28 and between pinion 26 and gear 27, the axis of the pinions (18) is inclined to a plane 32 perpendicular to the axis of the gears.

Adjacent pinions 25, 26 and coaxial with said pinions are other pinions 33, 34 having a much narrower face and meshing with the same gears 27, 28. The pinions 33, 34 contain different numbers of teeth than pinions 25, 26. For instance if the pinions 25, 26 contain each 14 teeth, the pinions 33, 34 may be provided with 12 teeth each, or if so desired with 16 teeth.

Figure 3:
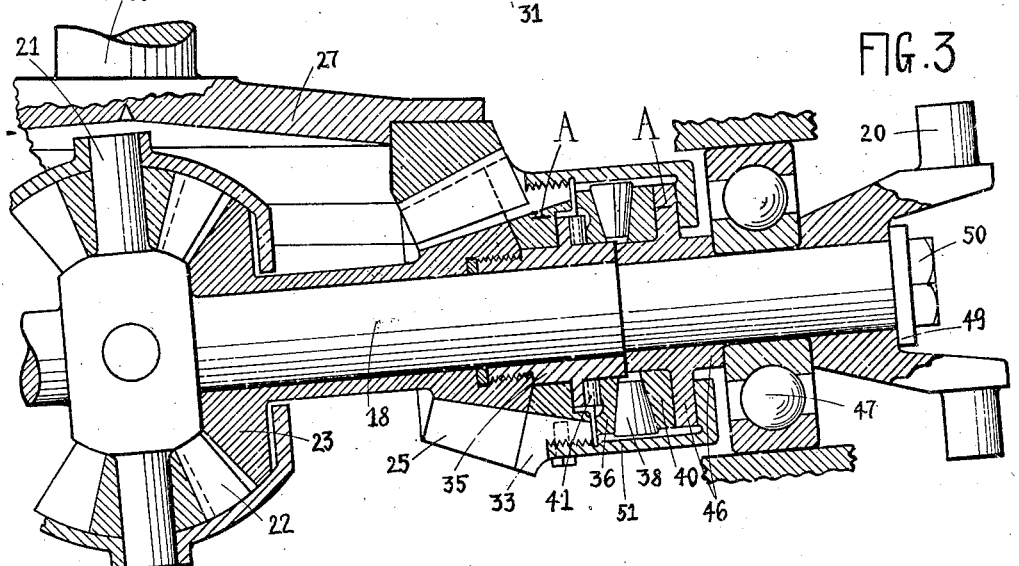
Fig. 3 is a partial view of Fig. 2 in an enlarged scale.

In the embodiment Fig. 2 and Fig. 3 I have assumed that the number of teeth of the pinions 33, 34 is smaller than the number of teeth of the pinions 25, 26. Pinions 33, 34 are loosely mounted on a hub 35, which is rigidly connected with a pinion 25 or 26, by any means such as a screw thread which is prevented from loosening. On account of the different numbers of teeth of pinions 33, 34, as compared with pinions 25, 26, the pinions 33, 34 will turn on hub 35, motion being transmitted from pinions 25, 26 to the gears 27, 28 respectively, and thence back to the pinions 33, 34. The turning motion of a pinion 33 or 34 will be for instance $\frac{14}{12}$ or also $\frac{7}{6}$ revolution per revolution of a pinion 25 or 26, if the numbers of teeth are 12 and 14 respectively.

Figure 4:
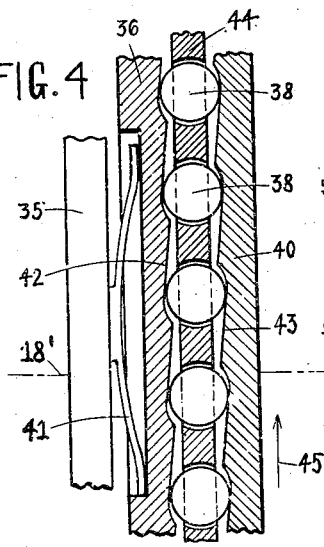
Fig. 4 is a section through a one way clutch, along lines A—A of Fig. 3, the section being taken in circumferential direction and having been developed to a plane.

When now the turning velocity of a pinion 25 drops to say $\frac{6}{7}$ of the average velocity, through the action of the differential gear, the turning velocity of pinion 33 will drop proportionately. In the said example, the speed of the pinion will be $\frac{6}{7}$ times the former speed of $\frac{7}{6}$ revolutions, per revolution of pinion 25, that is to say, pinion 33 will assume a speed equal to the average speed of the differential gear, or also of drive shaft 18. When the speed of pinion 25 drops further, the speed of pinion 33 will be further reduced to a speed below the speed of shaft 18. Relative motion between pinion 33 and drive shaft 18 is then reversed. According to my invention the said reversal of relative motion is utilized for establishing a definite relation between the speeds of the two driven wheels, by locking pinions 33 with drive shaft 18. Means for locking in one direction and permitting freedom in the other direction may be called a one way clutch, or also mechanical valve, and may be made of numerous constructions. The one way clutch shown in Fig. 3 comprises a ring 36, tapered rollers 38, and another ring 40, ring 36 being gently pressed towards ring 40 by a flat spring 41, which bears against a projection of hub 35. The configuration of rings 36 and 40 is seen in Fig. 4, which is a developed section taken along lines A—A in the direction of the circumference, 18' being the direction of the axis of said rings. A number of rollers 38 engage substantially parallel wedge like portions 42, 43 of rings 36, 40, said portions being parts of helicoidal surfaces concentric with the axis of said rings (see also Fig. 5). The rollers may be resting in a retainer ring 44. The rings and rollers are held in contact by the above said spring 41.

When ring 40 is moved in the direction of arrow 45 relatively to ring 36, it will move on the rollers 38 and increase the distance between the two rings 36, 40.

Ring 40 is somewhat loosely held by a flanged part 46, which is keyed to drive shaft 18, and which is held in its place, together with a bearing 47 and fork 20, by a washer 49 and screw 50. Ring 36 is loosely held by hub 35 and is separated axially from pinion 33 by only a slight gap. In addition the rings 36, 40 contain projections, which engage a slot of a cup 51 rigidly connected with pinion 33, as will be further explained hereafter.

Ordinarily pinion 33 (or 34) will turn faster than pinion 25 and drive shaft 18, and will therefore move ahead relatively to said pinion and to said drive shaft. Ring 36 follows pinion 33 and along with it also ring 40. The friction exerted by flanged part 46 on the advancing ring 40 tends to keep ring 40 back and to further approach the two rings 36, 40, so that free motion is assured. As the speed of pinion 25 drops and when the speed of pinion 33 comes down to the speed of drive shaft 18 (the average speed of the differential gear) and below said speed, the motion of the ring 40 with respect to flanged part 46 is reversed, and the friction exerted on ring 40 by said part then tends to move ring 40 ahead of ring 36, in the direction of arrow 45 (Fig. 4). The two rings 36 and 40 then expand relatively to each other, ring 36 gets in contact with pinion 33, and considerable pressure is exerted between pinion 33 and the flange of cup 51, which is rigidly secured to said pinion. Flanged part 46, which is keyed to the drive shaft, then carries pinion 33 along, through the friction created between its flange and the flange of cup 51 and ring 40, and drive is effected to gear 27 through pinion 33 instead of pinion 25. The one way clutch described, and other one way clutches can be readily designed to give immediate and positive action, so that drive is transmitted through pinion 33 immediately after its speed drops to the speed of the drive shaft 18.

As soon as both road wheels recuperate their grip on the ground, the pinion 33 is driven ahead again through gear 27, which again receives power from pinion 25. The one way clutch is then disengaged automatically through the friction caused by the relative motion of flanged part 46 oppositely to arrow 45 (Fig. 4), with respect to ring 40, and the free operation of the differential gear is again resumed.

If so desired, antifriction bearings may be provided between the flange of cup 51 and flanged part 46. The drive through pinion 33 would then be effected through the contact between flanged part 46 and ring 40 alone, but, on the other hand, the one way clutch may then be disengaged with reduced effort.

Engagement of the clutch might be called locking of the differential gear, although the two pinions 25 and 26 turn at somewhat different speeds. When a clutch is engaged, the two driven members (25, 26) which are operatively connected with two road wheels respectively, move in a fixed relation to each other, so that a position of the drive shaft corresponds to single positions of the two driven members.

Further means are provided, in accordance with the present invention, for preventing engagement of the one way clutches during reverse motion of the vehicle.

In reverse motion of the vehicle the shaft 18 turns in opposite direction, unless reversal is provided after the differential gear. Pinion 33 also moves in opposite direction, as compared with forward motion. The relative motion of the flanged member 46 with respect to ring 40 then takes place ordinarily in the direction of arrow 45 (Fig. 4), and the one way clutches would be locked, unless means were provided for preventing locking during reverse motion.

Figure 6:
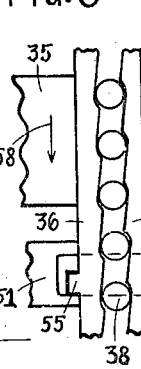
Fig. 6, Fig. 7, Fig. 8 are diagrams illustrative of the operation of a one way clutch, such as shown in Fig. 3.

Such means will be described particularly with reference to the diagrams Fig. 6 to Fig. 8. They consist in providing a slot 54 (see Fig. 5) in cup 51, said slot being wider than the projections 55, 56 of the rings 36, 40 respectively. Slot 54 and projections 55, 56 engage therefore with play or backlash.

During normal forward motion (Fig. 6), the hub 35 and flanged part 46 move in the direction of arrows 58 and 45' relatively to the rings 36 and 40 respectively. The rings are shown in development, and their projections 55, 56 are shown disposed on the sides, for convenience of explanation. Cup 51 containing slot 54 is also indicated in a merely diagrammatic manner in the Figures 6 to 8. The slight friction caused by the said relative motion keeps the projections 55, 56 in engagement with the lower side of slot 54. This position represents normal forward motion of the vehicle, with the one way clutch disengaged.

Figure 7:
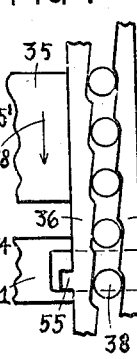

Fig. 7 illustrates the action when a road wheel slips and when the one way clutch is engaged. In this case relative motion of flanged part 46 is reversed, and takes place in the direction of arrow 45, while relative motion of hub 35 continues in direction of arrow 58. The result is that the clutch is engaged, as already described. It is noted that slot 54 is kept slightly wider than is necessary for complete engagement of the clutch.

Figure 8:
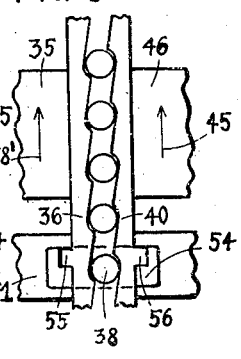

Fig. 8 indicates the action during reverse motion. The relative motions of hub 35 and flange 46 have both been reversed, as compared with Fig. 6, and take place in directions 58' and 45 respectively. The result is that the clutch moves bodily upwards, until both projections 55, 56 engage slot 54 on its upper end. Once arrived in this position, the clutch is kept completely disengaged. In going from position Fig. 6 to position Fig. 8, a different speed of rings 36 and 40 will not engage the clutch on account of the limited width of slot 54, for when the vehicle starts backwards even on its sharpest curve, ring 40 will advance not more than twice as fast as ring 36, and the relative displacement thus obtained is not sufficient to fully engage the clutch. When starting backwards on less sharp curves, the two rings 40, 36 move to the position Fig. 8 with smaller differences in speed, and they move exactly at equal speed, when the vehicle is reversed along a straight line.

Returning to the description of the gear pairs 25, 27 and 33, 27 gear 27 is provided with a slight extra width, to mesh with pinion 33. The tooth proportions are preferably determined to suit the pair 25, 27, and the same face angle and root angle is used on pinion 33, as on pinion 25. Only the tooth numbers of the two pinions are different.

The Figures 9 and 10 illustrate the developed tooth profiles of the two pairs, involute tooth profiles being shown for convenience. The teeth 60 of the pinion 25 mesh with the teeth 61 of gear 27 along a line of action which is tangent to the two base circles 62, 63. The numerals 64, 65 denote the pitch circles of this mesh, that is to say the circles which roll upon each other without sliding.

The profiles of the teeth 66 of pinion 33 correspond to a base circle 67, which is reduced as compared with base circle 62 of pinion 25 in proportion to the respective numbers of teeth. The gear 27, Fig. 10, is identical with the gear 27 indicated in Fig. 9. Mesh takes place along a line of action, which is tangent to the two base circles 63, 67, the pitch circles which roll upon each other without sliding being indicated at 68, 69. The teeth 66 of pinion 33 are seen to have a longer addendum than is ordinarily provided, but are found to be kinematically correct and to transmit true uniform motion.

A further embodiment of my invention will now be explained with reference to the Figures 11 and 12. In this embodiment a one way clutch is provided for engaging the drive shaft 18 directly with pinion 25, in case of slipping of a road wheel, whereas in the former embodiment engagement between the drive shaft and auxiliary pinion 33 is effected.

Pinion 33 is slidably mounted on pinion 25 and on a ring 71 rigidly connected with pinion 25. The two rings 71, 72 contain circular races for balls 73, and together form a thrust bearing of known type. The rings 72, 74 engage each other through other balls 75, or rollers and contain stepped partial raceways of wedge form, being parts of helicoidal surfaces, and constituting together a one way clutch, such as described with reference to Figures 4 and 5. A projection of each ring 72, 74 engages with a slot formed in a cylindrical projection 76 of pinion 33. Said projections engage the slot with play, as described with reference to Fig. 5.

Ring 72 is slidably mounted on a part 77 which is rigidly secured to pinion 25. Ring 74 is slidably mounted on a disk 78, which engages with slots of a cup 80 so as to be axially movable on said cup. The latter is keyed to drive shaft 18, and may contain a suitable bearing 81. A further disk 82 is held in cup 80, and alternate disks are held in slots of part 77. A light spring 83 is provided adjacent the back of part 77, for keeping said disks and rings in contact.

The operation is as follows: During forward motion of the vehicle the part 77 and disk 78 move relatively to the rings in the direction of arrows 58 and 45', see the diagram Fig. 13. The clutch is then disengaged. When the road wheel slips, which is the opposite of the one driven by pinion 25, relative motion of disk 78 will be in the direction of arrow 45 (Fig. 13). The clutch is then being engaged, projection 56 of ring 74 assuming the position shown in dotted lines, relatively to the slot 54. As soon as the clutch is engaged, drive shaft 18 and pinion 25 are locked together through frictional contact, and drive is effected from shaft 18 directly to pinion 25. When drive is effected in this manner, pinion 33 is turned again at increased speed, and by carrying ring 72 along disengages the clutch. Disengagement takes place without effort, inasmuch as ring 72 on one side bears on balls 73 and on the other side on balls 75. By the time of disengagement the slipping road wheel has ordinarily found hold again. If not, engagement of the clutch and subsequent disengagement starts over again.

An application of my invention to a conventional rear axle drive is illustrated in the Figures 14 and 15. The differential casing 84 is journalled in bearings 85 and receives motion through a gear 86, which meshes with a pinion not shown in the drawing. Planetary pinions 87 are rotatably secured to pivots 88, which are held in the differential casing 84. Casing 84 constitutes the driving member of the differential. The pinions 87 mesh with sun gears 90, 91 keyed to shafts 92, 93 respectively, which constitute the driven members of the differential. Casing 84 contains a coaxial gear 94 rigidly secured to it. Gear 94 meshes with another gear 95 rotatable on an axis 96, which is journalled in the rear axle housing. Another gear 97 containing helical teeth 98 is rotated in unison with gear 95, and meshes with a gear 99 which is slidably mounted on shaft 92, and which bears on one side on collar 100, see Fig. 15.

Other corresponding gears may be disposed on the side of shaft 93, which side is not completely shown in the drawing.

The gears 94, 95, 97, 99 are selected to provide a suitable ratio between gears 94 and 99, which is kept slightly larger or slightly smaller than one to one, for instance so that gear 99 turns $\frac{6}{7}$ revolutions per revolution of gear 94, as indicated approximately in the drawing. Gear 99 carries a toothed clutch member 101 slidably mounted thereon. Member 101 engages keyways of shaft 92 with teeth 102, and is suited to engage teeth 103 provided on the differential casing with teeth 104. Teeth 103 and 104 are shown in development in Fig. 16.

The friction exerted on gear 99, which ordinarily rotates slower than shaft 92, by said shaft and by member 101, tends to advance said gear 99. The tooth pressure exerted on said gear by gear 97 has therefore such a direction as to hold gear 99 back. With a rotation in a direction of arrow 105 the tooth pressure is found to be in a direction which gently presses gear 99 towards collar 100.

When slippage occurs, the velocity of shaft 92 drops below the velocity of gear 99. In other words, relative motion of gear 99 is reversed. The frictional forces act in opposite direction, and the tooth pressure exerted on the helical teeth of gear 99 then is in a direction towards the differential casing. Gear 99, and with it clutch member 101 start to move towards casing 84, and the teeth 104 of the clutch member engage the teeth 103 of casing 84, thereby connecting casing 84 with shaft 92 and locking the differential.

Disengagement is effected in a positive manner by a hollow cylindrical member 107 secured to gear 99, and containing a formed outline, see Fig. 17, which may bear against a cup 114 secured to casing 84. During engagement of the clutch the base 109 of said member contacts or approximately contacts with said cup, and as the projection 110 comes around, during the constant relative rotation of gear 99 with respect to casing 84, it moves gear 99 and with it clutch member 101 out of engagement.

To prevent engagement during reverse motion of the vehicle, a further hollow cylindrical member 111 is provided, slidably mounted on member 107 and axially fixed with respect to gear 99. It contains an extension 112 which engages a ball 113. Extension 112, ball 113 and a cup 114, secured to the differential casing, constitute a one way clutch. A partial section along lines C—C of Fig. 15 is indicated in Fig. 18. During forward drive friction is exerted on member 111 in a direction opposite to arrow 45 (Fig. 18), and keeps the one way clutch disengaged. The action of member 111 during forward motion is equivalent to non existence of said member. During reverse motion, friction moves projection 112 in direction of arrow 45 and engages the clutch. Member 111 is then locked to cup 114 and to the differential casing. Inasmuch as member 111 is axially fixed with gear 99, the latter is prevented from approaching the differential casing and from engaging the toothed clutch.

A further embodiment of my invention is illustrated in the Figures 19 and 20.

115 denotes a differential casing mounted on bearings 116 and receiving power through a bevel gear or hypoid gear 117. A stationary gear 118 is disposed adjacent a bearing 116. It meshes with a planetary gear 120, which is rotatable on an axis 121 journaled in the differential casing 115 and disposed parallel to the axis of said casing. Axis or shaft 121 contains two pinions 122 integral with said shaft, and meshing with gears 123, see Fig. 20. A gear 123 is journalled with a cup and cone bearing 124 in casing 115 and is further kept in position in any suitable manner. Gear 123 engages the projection of two rings 125, 126 with a slot, in a manner as described with reference to Fig. 5. Ring 125 is journalled on a projection of casing 115, and gently pressed towards ring 126 by a spring. It forms a one way clutch with ring 126 and balls 127. The latter is mounted on the hub of sun gear 128. A member 129 is movably keyed to said hub, and carries disks 130 with slots. The disks 130 alternate with disks 131 held in slots of the differential casing.

The operation is briefly the following: Gear 123 performs a constant small relative motion with respect to casing 115, which is in backwards direction in the illustrated example. When the motion of sun gear 128 is so reduced that it drops below the motion of gear 123, relative motion between ring 126 and sun gear 128 is reversed, and the multiple disk clutch 132 is engaged. It will be again disengaged as the speed of sun gear 128 rises.

Many further embodiments and modifications may be provided in my invention without departing from its spirit. For the scope of its interpretation I rely upon the annexed claims.

What I claim is:

1. A differential mechanism, containing a driving member and two driven members, means for transmitting torque from the driving member to said driven members in a manner as to permit various proportions of speed of an individual driven member as compared with said driving member, a plurality of one way clutches containing frictional surfaces engaging with each other and suited to form operative connections between the driving member and said driven members, and means for automatically operating a clutch when said proportion of speed assumes a predetermined limit amount.

2. A differential mechanism, containing a driving member and two coaxial driven members, a differential gear for transmitting torque from the driving member to said driven members in a manner as to permit various proportions of speed of an individual driven member as compared with the driving member, a plurality of clutches containing frictional surfaces engaging with each other and suited to form operative connections between the driving member and said driven members, means for automatically operating a clutch when said proportion of speed assumes a predetermined limit amount, and means for automatically preventing engagement of said clutches on reverse drive.

3. A differential mechanism, containing a driving member and two coaxial driven members, a differential gear for transmitting equal torque to said driven members in a manner as to permit various proportions of speed of an individual driven member as compared with the driving member, an axially engaging friction clutch for locking said differential gear, means for measuring said speed proportions and for operating said clutch when said speed proportion assumes a predetermined constant limit, and means for automatically preventing engagement of said clutch on reverse drive.

4. A differential mechanism, containing a driving member and two driven members, a differential gear for transmitting torque from the driving member to said driven members in a manner as to permit various proportions of speed of an individual driven member as compared with the driving member, gear pairs operatively connecting said driven members with the shafts containing the road wheels, other gears for registering a limit proportion of speed, said other gears being coaxial with said driven members and meshing with gears coaxial with said shafts at a ratio differing from the ratio of the above said gear pairs, and means for locking the differential gear, said means being operatively connected with the means for registering a limit proportion.

5. A differential mechanism, containing a driving member and two coaxial driven members, means for transmitting torque from the driving member to said driven members in a manner as to permit various proportions of speed of an individual driven member as compared with the driving member, gear pairs operatively connecting said driven members with shafts containing the road wheels, other gears coaxial with said driven members and meshing with the gears of said pairs coaxial with said shafts at a ratio differing from the ratio of the above said gear pairs, and means for automatically locking the differential gear when one of said other gears assumes a speed of rotation substantially equal to the speed of the driving member.

6. A differential mechanism, containing a driving member and two coaxial driven members, means for transmitting torque from the driving member to said driven members in a manner as to permit various proportions of speed of an individual driven member as compared with the driving member, gear pairs operatively connecting said driven members with shafts containing the road wheels, other gears coaxial with said driven members and meshing with the gears of said pairs coaxial with said shafts at ratios differing from the ratios of the above said gear pairs, friction clutches for establishing a fixed proportion between the motions of said driven members, and means for operating a friction clutch when one of said other gears assumes a speed of rotation substantially equal to the speed of the driving member.

7. A differential mechanism, containing a driving member and two coaxial driven members, a differential gear for transmitting torque from the driving member to said driven members, a pair of clutches disposed coaxial with said driven members for operatively connecting said driving member and said driven members, and frictional means for automatically maintaining said clutches out of engagement during reverse motion.

8. In a differential mechanism containing a gear reduction provided after the differential gear proper, a driving member and two driven members coaxial with the driving member, two pairs of pinions disposed coaxial with said members and containing different numbers of teeth, one pinion of each pair being connected with a driven member, coaxial gears connected respectively with road wheels, each of said gears meshing with one of said pairs of pinions, a pair of clutches for operatively interconnecting said coaxial members, and means for operating a clutch through reversal of relative motion between the other pinion of a pair and the coaxial driving member.

9. A differential mechanism, containing a driving member and two driven members coaxial with said driving member, a differential gear for transmitting torque from the driving member to said driven members, an additional gear coaxial with said members and geared at a fixed ratio other than unity with one of said members, said additional gear being thereby movable relatively to another of said members at a changing ratio and in a direction of rotation depending on the rate of differentiation, an axially engaging one way clutch for operatively connecting said driving member and said driven members, said clutch containing multiple friction disks, and means for engaging said clutch through reversal of relative motion between said additional gear and said other coaxial member.

10. A differential mechanism, containing a driving member and two driven members coaxial with the driving member, a differential gear for transmitting torque from the driving member to said driven members, a pair of additional gears coaxial with said members, each of the last said gears being geared up at the same fixed ratio other than unity relatively to one of said members and being thereby movable relatively to another of said members at a changing ratio and in a direction of rotation depending on the rate of differentiation, a pair of one way clutches for operatively interconnecting said driving member and said driven members, means for engaging a clutch through reversal of relative motion between an additional gear and said other member, and frictional means for automatically maintaining said clutches out of engagement during reverse motion.

11. A differential mechanism, containing a driving member and two driven members coaxial with the driving member, a differential gear for transmitting equal torque from the driving member to said driven members, pinions connected with said driven members, coaxial gears meshing with said pinions respectively and being connected with road wheels, other pinions disposed coaxial with the first named pinions and meshing with the same gears at different ratios than the first named pinions, said other pinions being thereby movable relatively to said driving member in a direction of rotation depending on the rate of differentiation, the axis of all said pinions being inclined to a plane perpendicular to the axis of said gears, a pair of clutches for operatively interconnecting the driving member and said driven members, and means for engaging said clutches through reversal of relative motion between said other pinions and the driving member.

12. A differential mechanism, containing a driving member and two driven members coaxial with the driving member, a differential gear for transmitting torque from the driving member to said driven members, pinions connected with said driven members, coaxial gears meshing with said pinions respectively and being connected with road wheels, other pinions disposed coaxial with the first named pinions and meshing with the same gears at different ratios than the first named pinions, said other pinions being thereby movable relatively to said driving member in a direction of rotation depending on the rate of differentiation, the axis of all said pinions being inclined to a plane perpendicular to the axis of said gears, one way clutches for operatively interconnecting the driving member and said driven members, means for engaging said clutches through reversal of relative motion between said other pinions and the driving member, and frictional means for automatically maintaining said clutches out of engagement during reverse motion.

13. In a differential mechanism, a driving member and two driven members coaxial with the driving member, a differential gear for transmitting equal torque from the driving member to said driven members, a part geared at a fixed ratio other than unity with one of said coaxial members, said part being thereby movable relatively to another of said members at a changing ratio and in a direction of rotation depending on the rate of differentiation, a clutch containing frictional surfaces engaging with each other for operatively interconnecting the driving member and the driven members, and means for engaging said clutch through reversal of relative motion between said part and said other member.

14. In a differential mechanism, a driving member and two driven members coaxial with the driving member, a differential gear for operatively interconnecting said members while permitting relative motion between said driven members, a part geared at a fixed ratio other than unity with one of said coaxial members, said part being thereby movable relatively to another of said members at a changing ratio and in a direction of rotation depending on the rate of differentiation, an axially engaging one way clutch for operatively interconnecting the driving member and the driven members, said clutch containing multiple disks frictionally engaging each other, and means for engaging said clutch through reversal of relative motion between said part and said other member.

15. In a differential mechanism, a driving member and two driven members coaxial with the driving member, a differential gear for operatively interconnecting said members while permitting relative motion between said driven members, two parts geared at the same fixed ratio other than unity with said driven members respectively, said parts being thereby movable relatively to the driving member at a changing ratio and in a direction of rotation depending on the rate of differentiation, two one way multiple disk clutches for connecting the driving member with said driven members, means for engaging said clutches through reversal of relative motion between said parts and the driving member, and frictional means for automatically maintaining said clutches out of engagement during reverse drive.

16. In a differential mechanism, a driving member and two driven members coaxial with said driving member, a differential gear for operatively interconnecting said members while permitting relative motion between said driven members, means for establishing a definite relation between said driven members, said means comprising an axially engaging friction clutch for operatively interconnecting said coaxial members and a part coaxial with a driven member and geared at a fixed ratio other than unity with said driven member, said part being thereby movable relatively to another of said coaxial members at a changing ratio and in a direction of rotation depending on the rate of differentiation, and means for engaging said clutch through reversal of relative motion between said part and the driving member.

17. In a differential mechanism containing a gear reduction after the differential gear proper, a driving member and two driven members coaxial with the driving member, a differential gear for operatively interconnecting said members while permitting relative motion between said driven members, two pairs of pinions disposed coaxial with said members, the two pinions of each pair containing different numbers of teeth, one pinion of each pair being connected with a driven member and containing a larger width of face than the other pinion of the pair, two gears connected with two road wheels respectively and meshing with said two pairs of pinions respectively, the pinion containing a smaller width of face being thereby movable at a constant ratio with respect to said one pinion of the respective pair and being movable relatively to the driving member at a changing ratio and in a direction of rotation depending on the rate of differentiation, a one way clutch for locking the differential mechanism, means for engaging said clutch through reversal of relative motion between one of said pinions containing a smaller width of face and the driving member, and frictional means for maintaining said clutch out of engagement during reverse drive.

18. In a differential mechanism containing a gear reduction after the differential gear proper, a driving member and two driven members coaxial with the driving member, a differential gear operatively interconnecting said members in a manner permitting various proportions of speed of the driven members, said differential gear comprising two gears concentric with said members and connected with two of said members and planetary gears journalled in the third of said members, a friction clutch for establishing another operative connection between said members, gears for registering a limit proportion of speed, and means for automatically engaging said friction clutch whenever said limit proportion is reached.

19. A differential mechanism, containing a driving member and two coaxial driven members, a differential gear operatively interconnecting said members in a manner permitting various proportions of speed of the driven members, a friction clutch for directly connecting two of said coaxial members, and means for automatically engaging said clutch when said proportion of speed assumes a predetermined limit amount.

20. A differential mechanism, containing a driving member and two coaxial driven members, a differential gear operatively interconnecting said members in a manner permitting various proportions of speed of the driven members, an axially engaging friction clutch for directly connecting two of said coaxial members, and means for automatically engaging said clutch when said proportion of speed assumes a predetermined limit amount.

21. In a differential mechanism, driving member and two driven members coaxial with the driving member, a differential gear operatively interconnecting said members in a manner permitting various proportions of speed of said driven members, two gears coaxial with said members and meshing both with a third gear at different ratios, one of said two gears being connected with one of said members, the other of said two gears being thereby movable at a constant ratio relatively to said one member and being movable relatively to another of said members at a changing ratio and in a direction of rotation depending on the rate of differentiation, means for preventing excess differentiation, and means for automatically engaging the last named means when the other of said two gears reverses its motion relatively to said other member.

22. A differential mechanism, containing a driving member and two coaxial driven members, a planetary gearing for transmitting torque from the driving member to said driven members, clutching means for operatively connecting said driving member and said driven members, means for engaging said clutching means, and frictional means for automatically maintaining said clutching means out of engagement during reverse motion of the vehicle.

23. In a differential mechanism, a driving member and two coaxial driven members, a differential gear operatively interconnecting said members, clutching means for connecting two of said coaxial members, automatic means for engaging said clutching means to prevent excess differentiation, and means for automatically maintaining said clutching means out of engagement during reverse motion of the vehicle, the last named means being contained entirely within the stationary differential casing.

ERNEST WILDHABER.